Oct. 25, 1932.   G. C. BAILEY   1,884,509
PRODUCTION OF CYANOGEN CHLORIDE AND SUBSTITUTED GUANIDINES
Filed Oct. 12, 1925
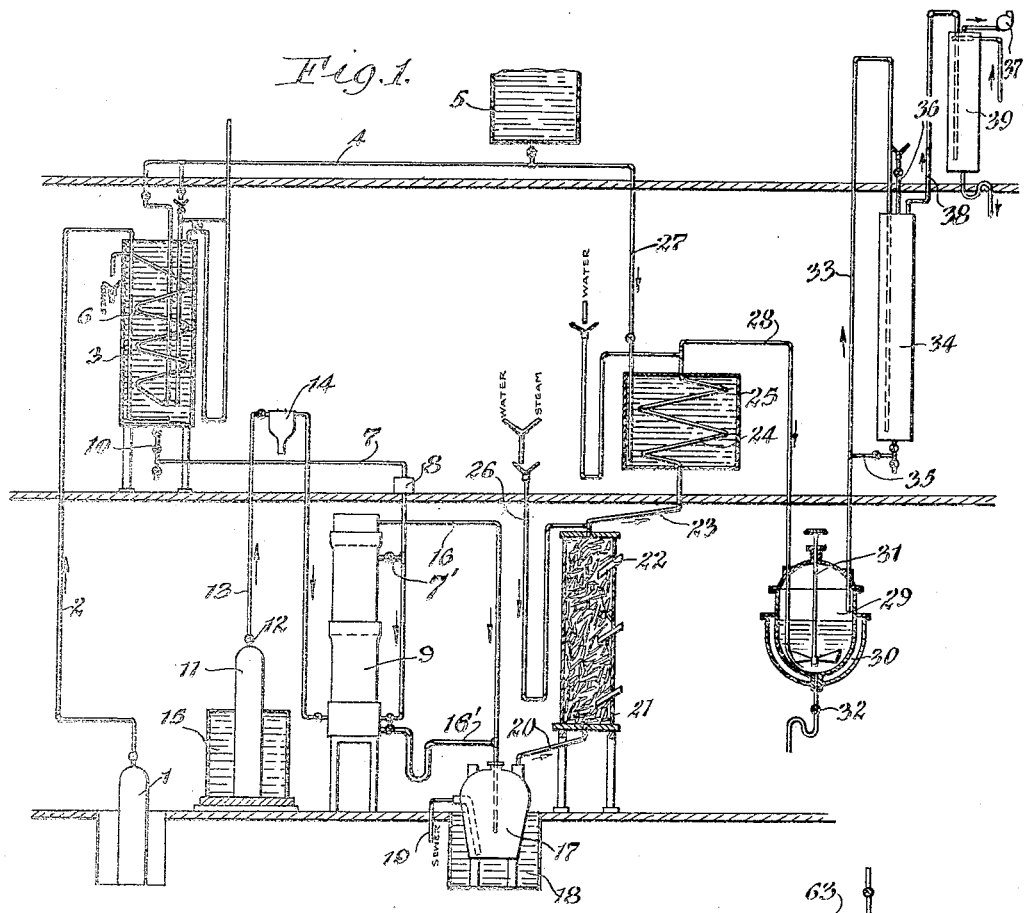
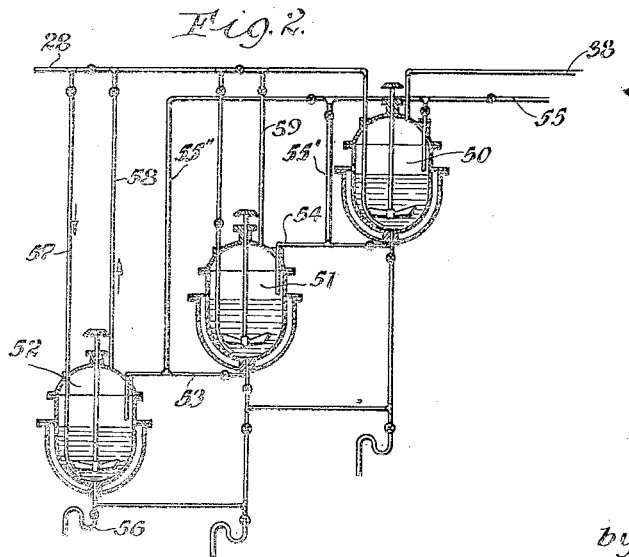
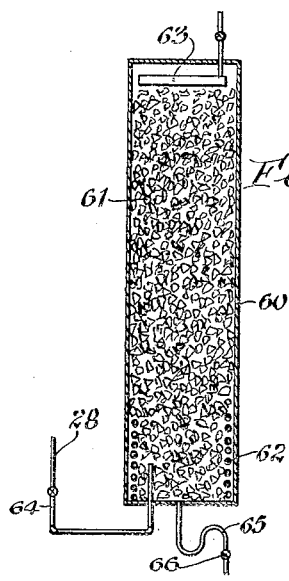
Inventor
GEORGE C. BAILEY.
by William J. Karalake
Attorney Patented Oct. 25, 1932

1,884,509

UNITED STATES PATENT OFFICE

GEORGE C. BAILEY, OF BUFFALO, NEW YORK, ASSIGNOR TO NATIONAL ANILINE & CHEMICAL CO., INC., OF NEW YORK, N. Y., A CORPORATION OF NEW YORK

PRODUCTION OF CYANOGEN CHLORIDE AND SUBSTITUTED GUANIDINES

Application filed October 12, 1925. Serial No. 61,991.

This invention relates to the production of cyanogen chloride and its use in the manufacture of substituted guanidines through its interaction with primary or secondary amines.

Diphenylguanidine, in the form of its hydrochloride, has been prepared heretofore by passing chlorine into a batch of hydrocyanic acid solution, or preferably moist mercury cyanide, and directing the gaseous cyanogen chloride thus obtained into aniline, without agitation, the reaction mass being kept in a molten condition by the external application of heat until no further absorption of cyanogen chloride has taken place. However, this process for the preparation of diphenylguanidine, while made the subject of later experiments to some extent, apparently remained in the experimental stage for the literature indicates that the lines along which commercial processes for the production of diphenylguanidine have developed, follow a method made public at a later period in which thiocarbanilide is subjected to the action of ammonia in the presence of a lead compound. The teaching of the art therefore indicates that the cyanogen chloride process is not suitable for the commercial production of diphenylguanidine or other substituted guanidine, and recent literature leads to the same conclusion (Naunton, Jour. Soc. Chem. Industry, vol. 44, page 243T).

According to the present invention the cyanogen chloride method for preparing substituted guanidines is made commercially feasible by providing a unitary process wherein cyanogen chloride is formed and, as it is formed, brought out of the reaction zone in a gaseous condition, purified and directed into contact with aniline or other amine. The invention in addition contemplates a process for the production of cyanogen chloride that may be defined as continuous to denote that relatively small portions of a cyanide and chlorine are brought into contact at any one time to be succeeded by other small portions, and the cyanogen chloride produced is separated therefrom.

In its narrower aspects, the invention has, as further objects, improvements in the process steps and related apparatus for increasing the effectiveness of the process, minimizing the hazards associated with the process, and producing a commercial product of high degree of purity.

Briefly described, the process, as practiced in accordance with this invention, comprises passing chlorine into contact with a cyanide solution, preferably a hydrogen cyanide solution, made in any suitable manner and separating with the aid of heat gaseous cyanogen chloride held in solution. The chlorine is preferably in slight excess, though an excess of cyanide can be employed without harmful effect. The gaseous products can then be passed over moistened scrap copper or other suitable metal to remove free chlorine, if present, and brought to a temperature of approximately 15° C., by cooling or otherwise, for the condensation of water. The major part of the hydrochloric acid is carried off in the solution from which the cyanogen chloride is distilled, and what little there may be retained in the gaseous products is practically removed by the water of condensation; but a neutralizing agent for the acid can be provided. After purification, the cyanogen chloride is brought into contact with aniline or other amine and this step of the process is preferably carried on in a continuous manner, either by separating the amine into a plurality of charges and leading unabsorbed cyanogen chloride from a more completely converted charge to a less completely converted charge, or by a countercurrent flow of the cyanogen chloride and the amine. Heat and agitation are preferably applied, as in the latter stages of the conversion.

As a precaution, the apparatus may be vented into a caustic potash or soda solution to render harmless any gases, particularly, if there is an excess of cyanide. The gases prior to their reaction with the amine may be passed through anhydrous calcium chloride; but a temperature of about 15° C. is found to be sufficiently effective in removing water so that what may remain in the cyanogen chloride does not have any material deleterious effect.

The substituted guanidine-hydrochloride, obtained by the reaction, is dissolved in water and is filtered. It is then added with stirring to caustic soda solution to neutralize the hydrochloric acid and precipitate the guanidine, which is thereupon filtered, washed and dried. Prior to precipitation, decolorizing carbon may be added, preferably in an acid solution, to remove coloring impurities, particularly, if highly discolored aniline or other amine is used in the reaction.

For a further understanding of the invention, reference is to be had to the accompanying drawing in which Fig. 1 diagrammatically illustrates an apparatus that is suitable for use in carrying out the process;

Fig. 2 shows a modified form of apparatus; and

Fig. 3 illustrates another modification.

For convenience, the description which follows is specific to the use of hydrocyanic acid and to the manufacture of diphenylguanidine, but it is to be understood that the process is not limited thereto.

In Fig. 1, a hydrocyanic acid gas cylinder 1 is connected by a pipe line 2 to a solution tank 3 filled with water. The gas is run in until a 2 to 10 percent, preferably 2 to 5 percent, solution of the gas is formed and the gas tank is then disconnected. Cold water has been previously admitted to fill the tank 3 through a feed pipe 4 from a supply tank 5, and a cooling coil 6 within the solution tank controls the temperature of the solution, preferably within a range from 0° to 10° C. In order to provide a supply of solution in excess of that contained in the solution tank, a second solution tank may be provided and connected in; or it is possible by use of a pressure control, constant temperature and flow meter, and a similar water control, as later described in connection with the chlorine supply, to use the one solution tank with a plurality of gas cylinders or other source of supply. An outlet pipe 7 leads from the bottom of the tank through a sight feed box 8 to the bottom of a stoneware tower 9, containing suitable inert packing, a needle valve 10 controlling the supply. Chlorine likewise is fed from a cylinder 11 through a pressure control valve 12, pipe 13 and flow meter 14 into the bottom of the tower. The chlorine, which is in liquid condition in the cylinder, is heated for gasification by immersion in a bath 15; and several chlorine cylinders may be provided, so that a constant pressure and a continuous feed of chlorine is available.

Instead of a concurrent movement of the reagents in the tower 9, a counter-current flow through the reaction zone may be provided; and in place of cylinders containing hydrocyanic acid gas or chlorine gas, generating apparatus for either one or both gases may be substituted. Such apparatus may be of any type known to the art, and the specific construction is not material to this invention.

The hydrocyanic acid solution and the chlorine react within the tower 9 to form cyanogen chloride. Preferably no cooling medium is applied to the tower, the heat of reaction being conserved for the following step. The liquid solution overflows from the tower, carrying the products out of the reaction zone, through a pipe 16 leading into a stoneware pot or stripper 17, which is set in a bath 18 maintained at about 90° C.; the heating is to insure the vaporization and the separation of the cyanogen chloride. The water and the products held in solution are drawn off or discharged through an overflow 19 into a sewer; and the gaseous products pass upwardly from the pot through a line 20 into the bottom of a purifying tower 21 provided with thermometer wells 22 and containing moistened scrap copper for absorbing any free chlorine. This tower can be omitted when the process is operated with an excess of hydrogen cyanide. From the tower 21 the gaseous products pass through a pipe 23 and a cooling coil 24 within a tank 25 wherein they are cooled to about 15° C., and water is thereby condensed and separated. The condensed water flows back into the purifying tower 21 to moisten the copper, and additional water and steam, if desired and when found necessary as, for instance, at the beginning of operation or for cleaning purposes, can be supplied from a pipe 26 to the purifier and through another pipe 27 to the cooler. An aluminum pipe 28 directs the purified cyanogen chloride into the bottom of a reactor, kettle or tower 29 containing a charge of aniline to be treated.

With a counter-current flow of the reagents through the reaction tower 9, chlorine passes in at the bottom, the hydrocyanic acid solution is passed in preferably some distance below the top as at 7', the reaction solution is drained into the pot 17 through the line 16', and gaseous products pass from the tower by means of the pipe 16 into the pot.

The hydrochloric acid, that is simultaneously produced with the cyanogen chloride, is so highly diluted with water that practically all is carried off in the waste liquor outlet 19 from the stripper and thus separated from the cyanogen chloride that passes out through the vapor line 20. What little hydrochloric acid may be carried in the gaseous products is found to be substantially returned by the water flowing from the purifying tower 21 into the stripper 17 and by the water of condensation from the cooler. However, to make certain that no hydrochloric acid is present, the bottom portion of the purifying tower 21 can contain calcium carbonate or other suitable neutralizing agent. An alternative arrangement is the use of the neutralizing agent in the reaction tower 9. Broken marble is particularly adapted for such use, and in the reaction tower may take the place wholly or in part of the inert packing.

The thermometers provided in the purifying tower 21 show the progress of the reaction between the hydrogen cyanide and the chlorine and the removal of chlorine. As the chlorine reacts with the copper, forming cuprous chloride, heat is given off. Too much heat given off, as indicated by a rise in temperature, is a sign of an over-excess of free chlorine and therefore shows a disproportionate feed of chlorine or a failure of the reaction to proceed properly. An increase in temperature, as indicated by the upper thermometers over that of the lower ones, is a sign that the copper in the lower part is not reacting sufficiently. The water condensed in the tower and trickling through the copper displaces from the copper the cuprous chloride formed, and this reacts with more chlorine and is thereby oxidized into cupric chloride, which is soluble and is carried back into the pot 17 and off in the overflow 19 to the sewer. Consequently the copper is kept clean for further reaction with chlorine.

While any suitable form of thermometer can be used, it is preferred to use recording thermometers so that a continuous record is provided and variations can be readily observed.

The kettle 29 in which the cyanogen chloride and aniline react is preferably of aluminum, and all the parts, such as the agitator, etc. which come in contact with the reaction mass are also preferably of aluminum; but in place of aluminum various aluminum alloys, such as duralumin, aluminum bronze, manganese-aluminum, etc., or enamel ware or glassware may be used. As the reaction between the cyanogen chloride and the aniline proceeds in the kettle 29, steam can be gradually admitted into the jacket 30 of the kettle to keep the mass in fluid condition until it reaches a temperature, preferably about 110° C. and not exceeding 130° C. as indicated by a thermometer inserted in the kettle. However, heat may be thus supplied to the aniline at the beginning of the reaction and maintained during the reaction. An aluminum or aluminum alloy agitator 31 within the kettle stirs the contents and promotes a uniform reaction. When the reaction is completed, i. e., when about 90 to 95 percent or more of the aniline has been reacted upon by cyanogen chloride, the charge is drawn off by opening the valve 32, and the kettle is again filled with aniline or with aniline partially treated with cyanogen chloride from a scrubbing tower or a second kettle 34 through a pipe 35. Unabsorbed cyanogen chloride passes by means of a pipe 33 from the kettle into the aniline tower or scrubber 34. A feed pipe 36 introduces fresh aniline into the latter. In order to further insure continuity of this part of the process, the reacting kettle or tower, or both, may be duplicated.

In place of the kettle 29 and tower 34 shown, a series of kettles or towers in cascade arrangement can be used. Such an arrangement is shown in Fig. 2 in which a series of three agitated kettles 50, 51, 52 are connected by pipe lines 53, 54, so that the product can flow from one to the next. This apparatus can be so operated that fresh aniline is continuously fed into the uppermost kettle 50 through the pipe 55 and the completed reaction product is drawn off from the lowest kettle 52 through the pipe 56. Cyanogen chloride then enters the kettle 52 through the valve-controlled pipe line 57, is led to the next kettle 51 by a line 58, and from there to the kettle 50 by the line 59. The aniline flow is regulated by valves, and the kettles are steam jacketed for heating; the pipe lines can also be heated. By this means a completed reaction product may be continuously withdrawn from the system while fresh aniline is continuously fed into it.

The arrangement of apparatus shown in Fig. 2 also lends itself to other modes of operation. The additional aniline feed lines 55′ and 55″, and associated valves, permit any one of the kettles 50, 51 or 52 to be charged with aniline, and the reaction begun and completed in a single kettle. By duplicating the cyanogen chloride gas line so that excess gas is led from any one kettle to any other— which duplication is omitted from the drawing for the sake of clearness—the kettles can be used in any sequence, the cyanogen chloride gas being preferably led first into the kettle containing the mass whose reaction is approaching completion. Or with a single gas line, the kettle 50 can be retained as a scrubber for excess cyanogen chloride from either of the kettles 51 or 52, these kettles being in turn charged with partially reacted aniline from the kettle 50.

Another form of apparatus suitable for the cyanogen chloride and aniline reaction is shown in Fig. 3. This embodiment consists of a single tower 60 with suitable packing 61 and a heating coil 62 preferably about the lower portion. Aniline flows in at the top through a sprayer 63 or other equivalent device and cyanogen chloride enters near the bottom through the line 64. By means of the coil 62 sufficient heat is applied to keep the reaction mass in a fluid condition which is drawn off through the outlet 65 provided with a valve 66. A trap formed in the outlet prevents the escape of gas.

In all of these embodiments, the whole system is preferably kept under slightly reduced atmospheric pressure by means of a vacuum pump 37 connected to the end of the system to prevent the escape of poisonous gases from the system. A scrubbing tower 39 containing caustic alkali may be interposed in the line 38 connecting the pump and the aniline tower 34 if desired, for preventing the escape of any harmful gases by neutralizing or absorbing them.

The diphenylguanidine - hydrochloride, which forms the product of the reaction, is further treated by dissolving in water, filtering, washing and precipitating the diphenylguanidine by running the solution into caustic soda or other suitable neutralizing agent. If the caustic soda is run into the solution, it is found that the salt (the hydrochloride) is occluded with the precipitated base, but with the salt solution run into the caustic soda the base is precipitated free from the salt. The filtration of the hydrochloride solution is preferably made in the presence of decolorizing carbon and with or without the addition of sufficient mineral acid, such as hydrochloric acid, to give an acid reaction, particularly if the aniline used in the reaction is discolored, as by this treatment the color may be substantially removed. After precipitation the diphenylguanidine is washed and treated in any suitable manner.

As the reaction is regarded as complete when about 95 percent of the aniline has reacted with cyanogen chloride, some aniline is present as a diluent during the reaction and in the diphenylguanidine-hydrochloride. This is subsequently separated in the washing of the precipitated diphenylguanidine. It can, however, be removed by extracting the aqueous hydrochloride solution with a hydrocarbon of the benzene series, solvent naphtha or other suitable solvent immiscible with water, which dissolves the aniline but not the diphenylguanidine-hydrochloride. This step of extraction is particularly applicable when larger percentages of aniline are present, and it has the added advantage of removing coloring matter present in the diphenylguanidine-hydrochloride.

The diphenylguanidine thus obtained is found to be substantially free from contaminating ingredients, such as triphenylguanidine, tetraphenylbiguanidine, carbodimides, etc. that accompany diphenylguanidine when made by the usual process of treating thiocarbanilide with ammonia in the presence of a lead compound (Naunton, Jour. Soc. Chem. Industry, vol. 44, 243T). The absence of impurities is evidenced by the melting point of 149.3° C., which is higher than that which has heretofore been ascribed to the commercially pure product, namely, 147.5° C. (Callan & Strafford, Jour. Soc. Chem. Industry, vol. 43, 1T—8T), and by its comparative freedom from color. Furthermore, it yields no precipitate when to 5 c. c. of a 1 percent solution dissolved in a slight excess of dilute hydrochloric acid there is added 1 c. c. of a 10 percent ammonium thiocyanate solution or a 20 percent perchloric acid solution, which the article by Callan & Strafford, noted above, gives as a test for pure diphenylguanidine.

By the cyanogen chloride process of the present invention, other substituted guanidines can be made with the use of other amines or a mixture thereof, such as, for example, toluidine, xylidine, naphthylamine, etc. Secondary amines or imines may also be employed whereby tetra-substituted guanidines are produced. It is to be understood, however, that the conditions of operation are varied to suit the amine under treatment. The temperature for instance should be such as to keep the reaction mass in a fluent condition as, for example, in the case of treating o-toluidine, a temperature of about 125° and below 150° C. is desirable; in general it is preferable that the temperature be kept near the fusion point, for with temperatures much above that point undesirable by-products begin to form.

I claim:

1. In the production of cyanogen chloride, the steps which comprise distilling it from an aqueous solution, and in the vapor phase separating cyanogen chloride from water and hydrochloric acid by condensing substantially all of the two latter therefrom by cooling.

2. The process of purifying substituted guanidines contaminated with amines which comprises extracting an aqueous solution of a salt of the substituted guanidine with an organic liquid as a solvent for the amines, said liquid being immiscible with water.

3. A process of separating aniline from admixtures thereof with diphenylguanidine-hydrochloride which comprises treating the mixture with water to dissolve the diphenylguanidine-hydrochloride, and extracting the resulting mixture with an organic liquid as a solvent for the aniline, said organic liquid being immiscible with water.

4. A process of separating diarylguanidine from arylamines which comprises converting the diarylguanidine into its hydrochloride, treating the diarylguanidine-hydrochloride with water to dissolve the same, and extracting the aqueous liquor with an organic liquid as a solvent for the arylamines, said organic liquid being substantially insoluble in water.

5. The process which comprises distilling cyanogen chloride in contact with water, and cooling the vapors evolved to separate out aqueous impurities while retaining the cyanogen chloride in the vapor phase.

6. In the manufacture of cyanogen chloride, a process which comprises subjecting a dilute solution of hydrogen cyanide to the action of chlorine, separating gaseous products from the reaction mass, directing the gaseous products in contact with relatively cool moistened copper, and further cooling the gaseous products to a temperature of approximately 15° C., to separate out aqueous impurities.

7. In the production of a substituted guanidine, a process which comprises forming cyanogen chloride continuously through the interaction of a cyanide solution and chlorine, removing any excess chlorine and entrained moisture from resulting gaseous products, and forthwith subjecting an arylamine having at least one hydrogen atom attached to the amino nitrogen to the action of the purified cyanogen chloride.

8. In the production of a substituted guanidine, a process which comprises continuously subjecting a solution of a cyanide to the action of chlorine, passing cyanogen chloride produced over moistened copper to remove free chlorine therefrom, condensing out moisture, and forthwith treating an arylamine having at least one hydrogen atom attached to the amino nitrogen with the remaining gaseous product.

9. In the production of a substituted guanidine, a process which comprises continuously subjecting an aqueous solution of a cyanide to the action of chlorine, removing products as they are formed from the reaction zone, separating cyanogen chloride in the gaseous state from excess chlorine and moisture, and forthwith treating an organic amine having at least one hydrogen atom attached to the amino nitrogen with the gaseous cyanogen chloride.

10. In the production of a substituted guanidine, a process which comprises continuously subjecting an aqueous solution of hydrogen cyanide to the action of free chlorine, removing cyanogen chloride in gaseous form from the reaction zone as it is formed, removing excess chlorine and moisture from the resulting gaseous cyanogen chloride, and continuously directing the resulting gaseous cyanogen chloride into contact with an arylamine of the benzene series having at least one hydrogen atom attached to the amino nitrogen.

11. In the production of diphenylguanidine, a process which comprises continuously subjecting hydrocyanic acid solution to the action of free chlorine, removing cyanogen chloride in gaseous form from the reaction zone as it is formed, removing excess chlorine and moisture from the resulting gaseous cyanogen chloride, and directing the resulting gaseous cyanogen chloride into contact with aniline.

12. In the production of diphenylguanidine, a process which comprises continuously subjecting a 2 to 5 per cent. solution of hydrocyanic acid to the action of free chlorine, removing products as they are formed from the reaction zone, separating cyanogen chloride in gaseous form from excess chlorine and moisture, and forthwith treating aniline with the gaseous cyanogen chloride.

13. A process for the production of diphenylguanidine, which comprises continuously passing free chlorine in contact with hydrogen cyanide in aqueous solution, heating to separate gaseous cyanogen chloride therefrom, directing said cyanogen chloride over copper, bringing said cyanogen chloride to a temperature approximating 15° C. to separate out aqueous impurities, while maintaining the cyanogen chloride in the gaseous state, passing the cyanogen chloride into aniline at a temperature not exceeding 130° C. until substantially converted into diphenylguanidine-hydrochloride, dissolving the diphenylguanidine-hydrochloride in water, and adding the solution to a solution of caustic soda to precipitate the diphenylguanidine.

14. A process of purifying substituted guanidines contaminated with amines which comprises treating an aqueous solution of a salt of the substituted guanidine with a solvent immiscible with water to extract the amine therefrom.

15. A process of purifying a diarylguanidine contaminated with arylamine which comprises treating an aqueous solution of a salt of the diarylguanidine with a hydrocarbon of the benzene series to extract the arylamine therefrom.

16. A process of separating aniline from admixtures thereof with diphenylguanidine-hydrochloride which comprises dissolving the same in water and extracting with benzene to remove the aniline.

17. In the manufacture of cyanogen chloride, a process which comprises subjecting a dilute solution of hydrogen cyanide to the concurrent action of chlorine, separating gaseous products from the reaction mass, directing the gaseous products in contact with relatively cool moistened copper, and further cooling the gaseous products to condense moisture while maintaining the cyanogen chloride in the gaseous state.

18. In the manufacture of cyanogen chloride, a process which comprises subjecting a dilute solution of hydrogen cyanide to the concurrent action of chlorine, directing gaseous products over moistened copper for reaction with any excess chlorine, condensing moisture present in said products while maintaining the cyanogen chloride in the gaseous state, and returning the water of condensation to the copper to aid in moistening the copper and displacing chlorinated copper therefrom.

19. A process of dehydrating cyanogen chloride which comprises subjecting gaseous cyanogen chloride to a temperature of approximately 15° C. to separate out entrained moisture.

20. In the production of a substituted guanidine, a process which comprises continuously passing an aqueous cyanide solution concurrently with chlorine upwardly through a reaction zone with formation of cyanogen chloride in solution, removing the resultant solution from the reaction zone and heating it to separate gaseous cyanogen chloride therefrom, removing any excess chlorine and entrained moisture from the gaseous cyanogen chloride, and directly passing the purified and dehydrated gaseous cyanogen chloride into contact with an organic amine having at least one hydrogen atom attached to the amino nitrogen.

21. In the production of a substituted guanidine, a process which comprises continuously passing aqueous hydrocyanic acid upwardly through a reaction zone concurrent with chlorine, removing the resultant solution and products from the reaction zone and heating them to separate cyanogen chloride in the gaseous state therefrom, directing the gaseous cyanogen chloride in contact with copper to remove any excess free chlorine, forthwith cooling the purified gaseous cyanogen chloride to remove moisture, and forthwith bringing said purified and dried gaseous cyanogen chloride into contact and reaction with a primary arylamine.

22. In the production of diphenylguanidine, a process which comprises continuously passing aqueous hydrocyanic acid, cooled to a temperature of about 0° to 10° C. and containing about 2 to 10 per cent. of hydrogen cyanide, upwardly concurrent with gaseous chlorine without cooling, continuously removing the resultant products and cyanogen chloride solution and heating them to separate cyanogen chloride in gaseous form therefrom, continuously directing the gaseous cyanogen chloride in contact with moist metallic copper to remove any excess free chlorine, cooling the substantially chlorine-free gaseous cyanogen chloride to about 15° C. to remove water, and forthwith passing the purified and dehydrated gaseous cyanogen chloride continuously into contact with aniline.

23. In the production of a substituted guanidine by the reaction of cyanogen chloride with an arylamine having at least one hydrogen atom attached to the amino nitrogen, the improvement which comprises carrying out the reaction in apparatus made of aluminum.

24. In the production of a substituted guanidine by the reaction of cyanogen chloride with an arylamine having at least one hydrogen atom attached to the amino nitrogen, the improvement which comprises carrying out the reaction in apparatus made of an aluminum alloy containing sufficient aluminum to resist the corrosive action of the reactants.

25. In the purification of cyanogen chloride, the process which comprises contacting the impure cyanogen chloride with moistened copper to remove chlorine, cooling the resulting gas just above the boiling point of cyanogen chloride to condense out entrained moisture, and returning the water so condensed to the copper to wash away the chlorinated products.

26. In the production of cyanogen chloride by continuously introducing chlorine into a 2 to 10 per cent. aqueous cyanide solution at an initial temperature of 0° to 10° C. without concurrent cooling, continuously removing the resulting solution and products and heating them to about 90° C. to separate cyanogen chloride in the gaseous state therefrom, the improvement which comprises removing free chlorine from said gaseous cyanogen chloride and cooling the cyanogen chloride to remove excess water while maintaining the cyanogen chloride in the vapor phase.

27. In the production of a substituted guanidine by the reaction of cyanogen chloride with an arylamine having at least one hydrogen atom attached to the amino nitrogen, the improvement which comprises carrying out the reaction in apparatus containing sufficient aluminum to resist the corrosive action of the reactants.

28. In the production of a substituted guanidine, the improvement which comprises forming cyanogen chloride continuously through the interaction of a cyanide solution and chlorine, removing any excess chlorine and entrained moisture from resulting gaseous products, and continuously interacting the purified cyanogen chloride with an arylamine having at least one hydrogen atom attached to the amino nitrogen at a temperature of about 110° to 130° C. and in the presence of an excess of the arylamine as a diluent.

29. In the production of a substituted guanidine, the improvement which comprises forming cyanogen chloride continuously through the interaction of a cyanide solution and chlorine, removing any excess chlorine and entrained moisture from resulting gaseous products, and continuously interacting the purified cyanogen chloride with an arylamine in a fluid condition, said arylamine having at least one hydrogen atom attached to the amino nitrogen, at a temperature of approximately the melting point of the arylamine and in the presence of an excess of the arylamine as a diluent.

30. The process of manufacturing diphenylguanidine by a continuous process which comprises passing an uninterrupted stream of cyanogen chloride vapors substantially saturated with water vapor into aniline maintained at pressures below atmospheric, removing the free aniline from the reaction product by washing said product with benzol, and treating the washed product with an alkaline solution of constant strength.

31. The process of manufacturing diphenylguanidine by a continuous process which comprises absorbing an uninterrupted stream of cyanogen chloride vapors in aniline contained in a plurality of absorbers, withdrawing the contents of one absorber saturated with cyanogen chloride while continuing the flow of said vapors therein, and treating the material so withdrawn to recover diphenylguanidine therefrom by removing the free aniline from the reaction product and treating the aniline free product with an alkaline solution of constant strength.

In testimony whereof I affix my signature.

GEORGE C. BAILEY.